United States Patent [19]

Rerup et al.

[11] Patent Number: 4,923,517

[45] Date of Patent: May 8, 1990

[54] GLASS FIBER REINFORCED CEMENT COMPOSITIONS

[75] Inventors: Hans J. Rerup, Hamilton, Canada; Evelyn N. Drake, Lebanon; Ilan Duvdevani, Leonia, both of N.J.

[73] Assignee: Exxon Research and Engineering Company, Florham Park, N.J.

[21] Appl. No.: 285,563

[22] Filed: Dec. 16, 1988

Related U.S. Application Data

[63] Continuation-in-part of Ser. No. 97,699, Sep. 17, 1987, abandoned.

[51] Int. Cl.$^5$ .............................................. C04B 14/44
[52] U.S. Cl. ...................................... 106/99; 428/392; 428/394; 106/85; 106/89; 106/111
[58] Field of Search ................... 106/99, 89, 111, 85; 428/392, 394

[56] References Cited

U.S. PATENT DOCUMENTS

| | | | |
|---|---|---|---|
| 3,642,728 | 2/1972 | Canter | 525/341 |
| 3,679,507 | 7/1972 | Marzocchi | 428/392 |
| 3,684,470 | 8/1972 | Marzocchi | 65/3.43 |
| 3,718,449 | 2/1973 | Fahey | 428/378 |
| 3,793,130 | 2/1974 | Marzocchi | 428/392 |
| 3,870,841 | 3/1975 | Makowski et al. | 524/132 |
| 3,954,490 | 5/1976 | Cockram | 106/99 |
| 4,013,478 | 3/1977 | Meyer | 106/99 |
| 4,015,994 | 4/1977 | Hill | 106/99 |
| 4,062,690 | 12/1977 | Litherland et al. | 106/99 |
| 4,123,287 | 10/1978 | Cockram | 106/99 |
| 4,173,486 | 11/1979 | Cheetham et al. | 106/99 |
| 4,188,421 | 2/1980 | Matsuura et al. | 428/392 |
| 4,598,012 | 7/1986 | Miller et al. | 428/273 |

Primary Examiner—Mark L. Bell
Assistant Examiner—Anthony J. Green
Attorney, Agent, or Firm—Richard E. Nanfeldt

[57] ABSTRACT

The present invention relates a cement composite containing glass fibers encapsulated with a polymeric coating which is formed from an organic solution of an interpolymer complex of an anionic polymer and a cationic polymer.

9 Claims, 3 Drawing Sheets 4,923,517

GLASS FIBER REINFORCED CEMENT COMPOSITIONS

This application is a continuation-in-part application of U.S. Ser. No. 097,699, filed Sept. 17, 1987, now abandoned which is based on Patent Memorandum 87-CL-002.

FIELD OF THE INVENTION

The present invention relates to bundles of glass fibers which are wrapped or encapsulated with an elastomeric coating which is formed from an organic solution of an interpolymer complex of an anionic polymer and a cationic polymer.

BRIEF ABSTRACT OF INVENTION

The present invention relates to glass fiber reinforced cement composites possessing high apparent toughness, ductility, flexural and tensile strengths with improved resistance to age embrittlement and strength loss. The improvements are achieved by encapsulating or wrapping multifilament bundles of glass fibers with a thin elastomeric polymeric film of sulfonated polymers and complexes thereof before incorporation into the composite matrix materials.

DESCRIPTION OF PRIOR ART

The instant invention relates to Glass Fiber Reinforced Cement (GFRC) composites Such composites are known to have superior toughness compared to non-reinforced cement as well as higher stiffness and strength. However, it is also known that GFRC composites undergo severe age embrittlement and lose strength in moist and warm environments. The GFRC composites of this invention, which incorporate coated bundles of multifilament glass fibers, possess high apparent toughness, ductility, flexural and tensile strength while improving resistance to age embrittlement and strength loss. The improvements in the instant invention are achieved by encapsulating or wrapping, not impregnating, multifilament glass strands with a thin, highly impermeable, polymeric film of sulfonated polymers and complexes thereof before incorporating into the composite matrix.

PRIOR ART AND PRESENT COMMERCIAL PRACTICE

The use of glass fiber strands in cementitious matrices, whether the glass fiber strands are incorporated in chopped or continuous form, has achieved wide spread use. However, while alkali resistant glass fibers, coated and sized fibers or impregnated glass fiber strands have been used, the glass fiber reinforced cementitious products still exhibit strength loss and embrittlement during aging. This invention provides a glass reinforced cement composite that incorporates polymeric coated bundles of glass fibers which impart improved mechanical properties to the composite and these properties are maintained over extended periods of time, wherein the bundles of glass fibers are wrapped or encapsulated with the polymeric coating and the individual fibers of the bundle are not coated with the polymer.

The following patents describe methods for coating glass fibers and strands and claim improved aging effects:

(a) Coating of individual glass fibers
U.S. Pat. Nos. 4,123,287; 3,718,449; 4,188,421; 4,173,486; 4,062,690; 4,015,994; 4,013,478; 3,925,286; and 3,954,490.

(b) Impregnation of strands, Cords, rovings
U.S. Pat. Nos. 4,101,334; 4,598,012; 3,793,130; 3,684,470; and 3,679,507.

Another article by A. Bentur and S. Diamond, "Effects of Direct Incorporation of Microsilica into GFRC Composites on Retention of Mechanical Properties After Aging", Proceedings "Durability of Glass Fiber Reinforced Concrete Symposium" PCI, Chicago, Nov. 12-15, 1985, teaches GFRC composites.

In recent years, interpolymer complexes have received considerable attention in the literature due to their interesting and unique properties and their similarity to certain biological systems. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions, forming the complex. The counterions are now free to diffuse into the bulk solution. Normally, phase separation occurs upon prolonged standing. These high-charge density complexes are not readily formed in organic solvents due to the insolubility of the individual components. Therefore, little work has detailed the solution properties of these systems. To the inventors' knowledge, few studies have focused on the viscosification aspects of high or low-charge density complexes in organic diluents. In these studies, viscosity is used only as a tool to study the development and mechanism of complex formation.

Coatings with improved properties may be applied as thin films having a thickness range of 0.1–100 micrometers, with a preferred range of 0.2–20 micrometers. In order for such coatings to be functional on bundles of glass fibers they have to meet one or more of the following criteria: the composite does not lose strength upon aging; applied thin coating should be a continuous film with few or no defects; there should be a proper adhesion between the bundles, glass fibers and the polymeric coating and between the polymeric coating and matrix material; and the polymeric coating should not impregnate the bundles of glass fibers and the coating should not coat the individual fibers of the bundle or fill the voids between the fibers of the bundle.

The material used in the thin film coating should have an optimized balance of properties, such as elasticity, toughness, hardness, abrasion resistance, etc., for durability under adverse conditions.

The instant invention teaches that a solution of an inter-polymer complex of an anionic polymer and a cationic polymer where at least one of the two polymers is elastomeric can meet many of the requirements for an improved thin film coating on glass fibers.

SUMMARY OF THE INVENTION

The present invention relates to bundles of glass fibers which are encapsulated with an elastomeric coating which is formed from an organic solution of an interpolymer complex of an anionic polymer and a cationic polymer.

GENERAL DESCRIPTION

The present invention relates to a process for forming a composite of bundles of glass fibers which are encapsulated with an elastomeric coating, wherein the elastomeric coating wraps the bundle of fibers and the elastomeric coating does not coat the individual fibers nor does the coating impregnate the bundle of fibers or fill the voids between the individual fibers. The elastomeric coating is formed from an organic solution of an organic liquid and an interpolymer complex of a cationic polymer and an anionic polymer.

The component materials of the instant process for forming the elastomeric coating generally include a water insoluble interpolymer complex dissolved in an organic solvent system to form a solution with a concentration level of 0.1 to 20 weight percent. The solvent system comprises an organic solvent with or without a polar cosolvent, such as alcohol or amine. The solvent can be an organic liquid which is capable of dissolving the polymeric backbone. A cosolvent may be needed to break up associated domains resulting from aggregation of ionic species.

In general, the interpolymer complex is formed from the interaction in solution of a water insoluble anionic, sulfonated polymer and a cationic copolymer, such as styrene/vinyl pyridine copolymer. The water insoluble anionic sulfonated polymer will comprise from about 4 to about 200 milliequivalents of pendant sulfonate groups per 100 grams of polymer, more preferably from 10 to 100 meq. pendant sulfonate groups. In most instances, the sulfonates utilized in the instant invention are acids or are neutralized with transition elements selected from Groups IVA, VA, VIA, VIIA, VIIIA, IB and IIB of the Periodic Table of Elements and lead, tin and antimony, as well as ammonium and amine counterions. Sulfonated polymers which are subject to the process of the instant invention are illimitable and include both plastic and elastic polymers. Specific polymers include sulfonated polystyrene, sulfonated t-butyl styrene, sulfonated ethylene copolymers, sulfonated a tactic propylene polymers and propylene copolymers, sulfonated styrene/acrylonitrile copolymers, sulfonated styrene/methyl methacrylate copolymers, sulfonated block copolymers of styrene/ethylene oxide, sulfonated copolymers of acrylic acid copolymers with styrene, sulfonated polyisobutylene, sulfonated ethylenepropylene terpolymers, sulfonated polyisoprene copolymers (Butyl rubber), and sulfonated elastomers and their copolymers. The preferred sulfonated polymers of the instant invention are ethylene-propylene terpolymers Butyl rubber and polystyrene, wherein the ethylene-propylene terpolymers and polystyrene are most preferred.

Neutralization of the cited polymers with appropriate metal hydroxides, metal acetates, metal oxides, or ammonium hydroxide, etc. can be conducted by means well known in the art. For example, the sulfonation process as with Butyl rubber, containing a small 0.3 to 1.0 mole percent unsaturation, can be conducted in a suitable solvent, such as toluene, with acetyle sulfate as the sulfonated agent, such as described in U.S. Pat. No. 3,836,511, incorporated herein by reference. The resulting sulfonic acid derivative can then be neutralized with a number of different neutralization agents, such as sodium phenolate and similar metal salts. The amounts of such neutralization agents employed will normally be stoichiometrically to the amount of free acid in the polymer, plus an unreacted reagent which is still present. It is preferred that the amount of neutralizing agent be equal to the molar amount of sulfonating agent originally employed plus 10 percent more to ensure full neutralization. The use of an excess of such neutralization agent is necessary to effect at least 50 percent neutralization of the sulfonic acid groups present in the polymer, preferably at least 90 percent, and most preferably essentially complete neutralization of such acid groups should be effected.

Thus, the degree of neutralization of said sulfonate groups may vary from 0 (free acid form) to greater than 100 mole percent, preferably 50 to 100 mole percent. With the utilization of neutralized sulfonates in this instant invention, it is preferred that the degree of neutralization be substantially complete, that is, with no substantial free acid present and without substantial excess of the base, other than that needed to ensure neutralization. The neutralized sulfonates possess greater thermal stability compared to their acid form. Thus, it is clear that the polymers which are normally utilized in the instant invention comprise substantially neutralized pendant groups and, in fact, an excess of the neutralizing material may be utilized without defeating the objects of the instant invention.

The sulfonated polymers of the instant invention may be neutralized prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well known to those skilled in the art, i.e., coagulation, steam stripping or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation since in situ neutralization requires preparation of the sulfonic acid in the organic liquid which is to be subjected to the instant process, or the acid form of the sulfonated polymer must be dissolved in said organic liquid. The latter approach may involve handling of an acid form of an ionic polymer which has limited thermal stability. Therefore, it is quite apparent that the preparation and isolation of a neutralized sulfonated polymer affords the maximum latitude in formulation, less problems in handling polymers of limited thermal stability and maximum control over the final mixture of sulfonated polymer, polar cosolvent and organic liquid.

The sulfonated polymers of the instant invention may vary in number average molecular weight from 1,000 to 10,000,000, preferably 5,000 to 1,000,000, most preferably from 10,000 to 600,000. These polymers may be prepared by methods known in the art, for example, see U.S. Pat. No. 3,642,728, hereby incorporated by reference.

The preferred sulfonated polymers for use in the instant invention, e.g., sulfonated ethylene propylene terpolymers, sulfonated polystyrene and substituted derivatives thereof, may be prepared by the procedures described in U.S. Pat. No. 3,870,841, filed October 2, 1972 in the names of H. S. Makowski, R. D. Lundberg and G. H. Singhal, hereby incorporated by reference.

The water insoluble base-containing copolymer will comprise from about 0.5 to 50 mole percent basic groups situated along the chain backbone or, alternatively, the basic groups content will range from about 4 meq. to about 500 meq. per 100 grams of polymer. The basic groups may be conveniently selected from primary, secondary and tertiary amine groups contained in polymerizable monomers. Included in these categories are pyridine, anilines, pyrroles, amides and other basic polymerizable ammonia derivatives. Specific polymers include styrene-4-vinylpyridine, styrene-2-vinylpyridine, t-Butyl styrene-4-vinylpyridine, ethylene-4-vinylpyridine copolymers, propylene-4-vinylpyridine copolymers, acrylonitrile-4-vinylpyridine, methyl methacrylate-4-vinyl pyridine copolymers, block copolymers and ethylene oxide/4-vinylpyridine, acrylic acid-4-vinylpyridine copolymers, ethylene-propylene-4-vinylpyridine terpolymers, isoprene-4-vinylpyridine, 4-vinyl pyridine-elastomers copolymers and the like. The preferred base-containing polymers of the instant invention are styrene and 4-vinylpyridine and ethylene-propylene terpolymers with grafted 4-vinylpyridine. The former polymers are the preferred species.

These materials are prepared through conventional solution, suspension and emulsion copolymerization techniques.

The copolymer of styrene/vinyl pyridine is typically formed by the emulsion copolymerization of freshly distilled styrene and vinylpyridine monomers. This method of copolymerization is generally known to those well versed in the art. As noted previously, solution of suspension techniques may also be used to prepare those base-containing polymeric materials.

The interpolymer complex of the neutralized sulfonated polymer and the copolymer of styrene/vinyl pyridine is formed by forming a first solution of the neutralized sulfonated polymer in the previously described solvent system. A second solution of the copolymer of styrene/vinyl pyridine is formed by dissolving the copolymer of styrene/vinyl pyridine in an aromatic solvent, such as xylene or benzene. The concentration of the neutralized sulfonated polymer in the first solution is about 0.1 to about 20 weight percent, more preferably about 0.5 to about 6.0. The concentration of the copolymer of styrene/vinylpyridine in the second solution is about 0.1 to about 20 weight percent, more preferably about 0.5 to about 10 and most preferably about 0.5 to about 6.0. The first solution of the neutralized sulfonated polymer and the second solution of the copolymer of styrene/vinyl-pyridine are mixed together, thereby permitting the interaction of the neutralized sulfonated polymer and the copolymer of styrene/vinylpyridine to form the water insoluble interpolymer complex. Alternatively, both polymers can be dissolved simultaneously in the same solvent system. The molar ratio of sulfonate groups in the neutralized sulfonated polymer to nitrogen in the copolymer of styrene/vinylpyridine in the interpolymer complex is about 0.1 to about 20, more preferably about 0.5 to about 10, and most preferably about 1 to about 5. The concentration of the interpolymer complex in the organic liquid is about 0.1 to about 20 weight percent, more preferably about 0.1 to about 10, and most preferably about 0.5 to about 6.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group IA and Group IIA, which include Li, Na, K, etc., Be, Mg, Ca, etc. We have found that these species do not interact as strongly with amine groups as the more preferred species described below. Those metals are commonly defined as members of the transition elements (see chemical text: *Chemical Principles and Properties*, by M. J. Sienko and R. A. Plane, McGraw Hill Book Co., 1974, p. 19). These metal cations are best exemplified by zinc and interact strongly with pyridine and similar amines. As a consequence, a zinc neutralized sulfonated polymer interacts much more strongly with a styrene/vinylpyridine copolymer than does a magnesium or sodium neutralized system. It is for this reason that the transition elements are preferred, with zinc, copper, iron, nickel and cobalt being especially preferred. We also include antimony and lead a suitable cations.

A third species which is preferred is the free acid of the sulfonated polymer, which will also interact with amine-containing polymers. In this latter case, it is clear that the interaction is a classic acid-base interaction, while with the transition metals a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned and that they are apparently formed so far removed from their expected stoichiometry (based on small molecule analogs).

As discussed above, a variety of polymer backbones will display the desirable properties discovered in this invention and are summarized as follows:

| Sulfonate Polymer | Amine Polymer |
| --- | --- |
| Sulfo-EPDM | Styrene/Vinylpyridine Copolymer |
| Sulfonate Isoprene Copolymers | |
| Sulfonate SBR Polymers | Vinylpyridine/Styrene/Butadiene Terpolymers |
| Sulfonate Butadiene Polymers | |
| Sulfonated Butyl | Isoprene/Vinyl Pyridine Copolymer |
| Sulfonated Acrylate and Methacrylate Copolymers | |
| Sulfonated Block Polymers | Ethylacrylate/Vinylpyridine Copolymer and Alkyl Acrylate Copolymers and Vinyl Pyridine where the Alkyl group varies in carbon number from 1 to 18 |
| | Methyl Methacrylate/Vinyl Pyridine Copolymer and Alkyl Methacryl-late copolymers with Vinylpyridine wherein the number of carbon groups in the alkyl group varies from 1 to 18 carbon atoms |
| | Butadiene/Vinylpyridine Copolymer |
| | Propylene/Vinylpyridine Block Copolymer |
| | Ethylene/Vinylpyridine Block Copolymer |
| | t-Butyl Styrene/Vinyl-pyridine copolymers |
| | Vinylpyridine Copolymers with alpha-beta ethylenically |

| Sulfonate Polymer | Amine Polymer |
| --- | --- |
| | unsaturated copolymers or terpolymers |

The amount of vinylpyridine in the amine-containing polymer can vary widely, but should range from less than 50 mole percent down to at least 0.5 mole percent. A minimum of two basic groups must be present on the average per polymer molecule in order to create networks and the basic nitrogen content generally will range from 4 meq. per 100 grams of polymer up to 500 meq. per 100 grams. A range of 8 to 200 meq. per 100 grams is preferred.

Preferably, the amine content in the basic polymer is expressed in terms of basic nitrogen. In this respect, the nitrogen content in amides and similar non-basic nitrogen functionality is not part of the interacting species.

The organic liquids which may be utilized in the instant invention are selected with relation to the ionic polymer and vice-versa. The organic liquid is selected from the group consisting of aromatic hydrocarbons, aliphatic hydrocarbons, cyclic aliphatic ethers, aliphatic ethers or organic aliphatic esters and mixtures thereof.

Specific examples of organic liquids to be employed with the various types of polymers are:

| Polymer | Organic Liquid |
| --- | --- |
| sulfonated polystyrene | benzene, toluene, ethyl benzene, methylethyl ketone, xylene, styrene, ethylendichloride, methylene chloride. |
| sulfonated poly-t-butyl-styrene | benzene, toluene, xylene, ethyl benzene, styrene, t-butyl styrene, aliphatic oils, aromatic oils, hexane, heptane, decane, nonane. |
| sulfonated ethylene-propylene terpolymer | pentane, aliphatic and aromatic solvent oils, such as Solvent "100 Neutral", "150 Neutral" and similar oils, benzene, diesel oil, toluene, xylene, ethyl benzene, pentane, hexane, heptane, octane, iso-octane, nonane decane aromatic solvents, ketone solvents. |
| sulfonated styrene-methyl methacrylte copolymer | dioxane, halogenated aliphatics, e.g., methylene chloride, tetrahydrofuran. |
| sulfonated polyisobutylene | saturated aliphatic hydrocarbons, diisobutylene, triisobutylene, aromatic and alkyl substituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons, "Solvent 100 Neutral", "Solvent 150 Neutral", and all related oils, low molecular weight polymeric oils such as squalene, white oils and process |
| sulfonated polyvinyl toluene | oils having 60 percent or less aromatic content. toluene, benzene, xylene, cyclohexane, ethyl benzene, styrene, methylene chloride, ethylene dichloride. |

In order to reduce the viscosity of organic solution of the interpolymer complex to be able to employ the organic solution in a casting process, a polar cosolvent may be added to the organic solution of the interpolymer complex to solubilize the pendant ionomeric groups. The polar cosolvent will have a solubility parameter of at least 10.0, more preferably at least 11.0, and is water miscible and may comprise from 0.01 to 15.0 weight percent, preferably 0.1 to 5.0 weight percent, of the total mixture of organic liquid, water insoluble ionomeric polymer and polar cosolvent.

Normally, the polar cosolvent will be a liquid at room temperature, however, this is not a requirement. It is preferred, but not required, that the polar cosolvent be soluble or miscible with the organic liquid at the levels employed in this invention. The polar cosolvent is selected from the group consisting essentially of water soluble alcohols, amines, di- or tri-functional alcohols, amides, acetamides, phosphates, or lactones and mixtures thereof. Especially preferred polar cosolvents are aliphatic alcohols, such as methanol, ethanol, n-propanol, isopropanol, 1,2-propane diol, monoethyl ether of ethylene glycol and n-ethylformamide.

The elastomeric coating of the bundles of the glass fibers is done by applying the organic solution of the interpolymer complex over the substance at an ambient temperature or at 10°–50° C., by either dip-coating or spray-coating or with the use of other techniques for thin spreading (such as brushing). The organic solvent system is then permitted to evaporate with or without the aid of forced drying gas, such as air or nitrogen gas. This step is called the drying process. The drying gas temperature can be from ambient temperature up to the boiling point of the organic solvent system. Preferably the temperature of the drying gas is between 20° C. to 100° C. The most preferred temperature of the drying gas should be about 70° C. for fast evaporation of the organic solvent system. After drying the thickness of the applied coating to the bundles of glass fibers should be about 0.1 micrometer to about 100 micrometers, most preferably 0.2 to 20 micrometers. Multiple layers of polymers can be applied where the ion containing elastomeric component is at any of the layers but preferably in the layer closest to the bundles of the glass fibers to provide the defect free thin skin over the bundles of the glass fibers. The elastomeric coating encapsulates or wraps the bundles of glass fibers and the coating does not coat the individual fibers of the bundles of the glass fibers nor does the coating impregnate and fill the voids contained within the bundles of glass fibers. Most preferred, the coating thickness should be about 0.2 to about 20 micrometers for both performance and economic reasons. To control the thickness of the applied coating, the solution concentration of the interpolymeric complex is applied at 0.5 to 6 weight percent. Most preferably, the concentration should be about 5 weight percent. The coating solution of the interpolymeric complex can be applied in single or multiple layers, depending on the desired coating thickness. In any instance, the organic solvent system is evaporated after each layer application.

The bundles of the glass fiber or glass rovings used in the instant invention are based on any known glass compositions such as boro-silicates but preferably glass fibers of the alkali resistant type commonly known as AR glass. The fibers of the bundles may or may not be sized (individually coated with coatings known in the art for improved handling and performance). The strands or bundles of glass fibers used in the instant invention contain 2 to 2000 fibers, most preferably 50 to 800 individual fibers where the diameter of the individual fibers range from 1 to 50 micrometers, preferably 5 to 20 micrometers per fiber. The fiber strands can be continuous or chopped. Chopped strands are normally in the 1 to 100 millimeter length, more preferably 6 to 60 millimeter long.

The elastomeric coated bundles of glass fibers of the instant invention are incorporated into cement in order to reinforce the cement thereby increasing the tensile properties and ductility of the cement composites.

The cementitious matrix formulation may contain any cement formulation known in the art including cement, Portland cement, concrete, mortar, gypsum and hydrous calcium silicate. The concentration of the elastomeric coated bundles of glass fibers is 0.1 to 60 wt. % of total composite weight. The coated bundles of glass fibers may be placed randomly in the composite or they may be oriented in prescribed patterns. They may be continuous or chopped.

DETAILED DESCRIPTION OF THE PREFERRED EMBODIMENT

Figures 1A, 1B:
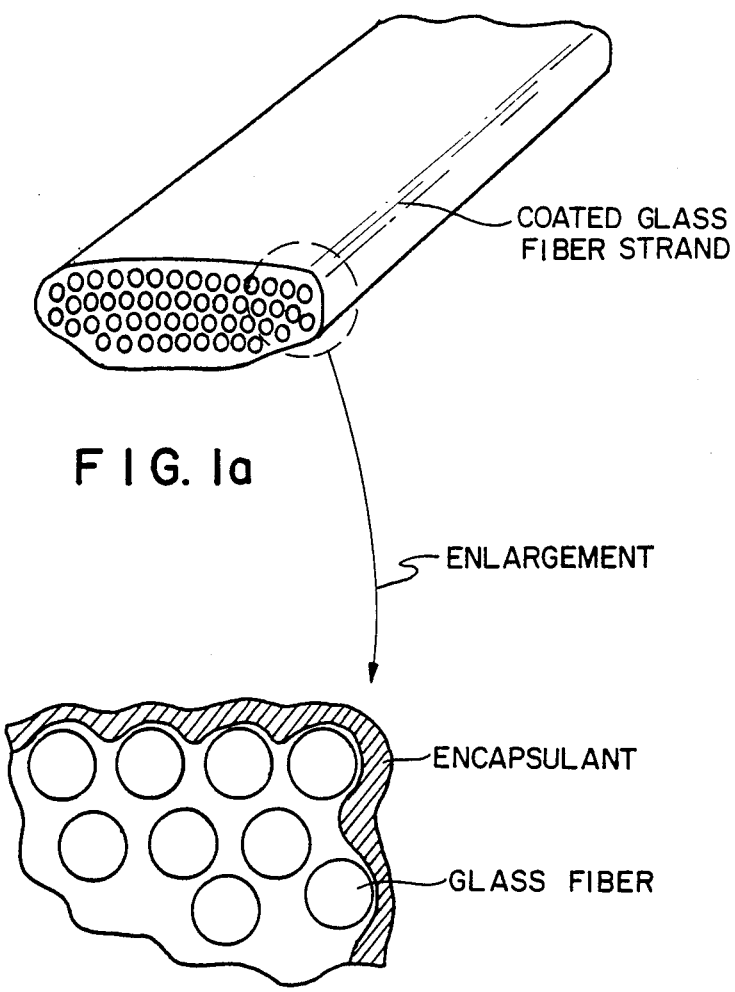
FIG. 1(a) shows a polymer film on the surface of a glass fiber strand.
FIG. 1(b) is an enlarged view of a portion of the glass fiber strand shown in FIG. 1(a).

The following Examples will demonstrate the performance of an interpolymer complex consisting of a sulfonated polystyrene and a styrene-4-vinylpyridine.

EXAMPLE 1

Preparation of Sulfonated EPDM

A sulfonated EPDM terpolymer (TP-320) is prepared by sulfonating a 40 Mooney viscosity at 100° C. EPDM terpolymer (Royelane 521-Uniroyal) which has about 50 weight percent ethylene, about 5 weight percent ENB, with acetyl sulfate and neutralizing with $Zn(Ac)_2$ according to the procedure of U.S. Pat. No. 3,836,511, herein incorporated by reference, thereby producing 25 meq. of zinc sulfonate groups per 100 grams of the EPDM polymer.

EXAMPLE 2

Preparation of Styrene-4-Vinyl Pyridine Copolymer

A copolymer of styrene-4-vinyl pyridine was prepared via a free radical emulsion copolymerization process. The preparation was conducted as follows:

In a suitable, stirred reaction vessel under a nitrogen blanket the following ingredients were charged:
120 ml. distilled water
50 g. styrene
3.2 g. sodium lauryl sulfate
0.1 g dodecylthiol
0.2 g. potassium persulfate
4.7 g. 4-vinyl pyridine The polymerization was conducted at 50° C. for 24 hours and the resultant emulsion was fluid and uniform. Three ml. of methanol containing 0.1% of hydroquinone was added as an inhibitor and the reaction mixture was precipitated in a large excess of acetone. The precipitate was filtered, then suspended in methanol and blended in a Waring blender to finally disperse any coagulated polymer. The suspension was filtered and dried in a vacuum oven at 60° C. for 24 hours.

The resulting product represented 80% conversion of the reactive monomers and containing 1.68% nitrogen corresponding to 12.5 mole percent 4-vinyl pyridine incorporation.

EXAMPLE 3

A solution (PC-22) of two polymers capable of complexing with each other was prepared in a mixed solvent as follows:

A solvent system was made up by mixing 93 parts by weight of toluene, 5 parts of isopropanol and 2 parts of methanol. Two solutions were prepared containing a single polymer each at a concentration of 2.5 wt. % each by dissolving in the above solvent system using a magnetic stirrer at room temperature. The polymers were a zinc salt of sulfo-EPDM and a copolymer of styrene and 4-vinylpyridine (SVP-706C). The two individual solutions were mixed together at equal weights each to yield a solution at 2.5 wt. % concentration containing equal amounts of each of the two polymers.

The sulfonated EPDM was based on an EPDM containing 55 wt. % ethylene, 40 wt. % propylene and 5 wt. % ethylidine-norbornene (ENB). The weight average molecular weight of the EPDM terpolymer was about 90,000. It was sulfonated to 20 milliquivalents of sulfonate groups per 100 grams of EPDM, by an acetylsulfate reagent as described in U.S. Pat. No. 3,836,511. It was neutralized by a zinc counter ion using 43 milliequivalent per 100 gram EPDM of zinc acetate.

The SVP copolymer contained about 8 mole % of 4 vinyl-pyridine and had an intrinsic viscosity of about 2.9 in xylene at 25° C. It was prepared by an emulsion polymerization method.

The solutions of the mixed polymers (PC-22) had a viscosity of 106 cP at 25° C. at a shear rate of 300 1/sec. as measured on a Haake CV-100 viscometer. The solution thickened up to a very high viscosity which could not be measured upon a slight evaporation of the solvent system.

Figure 2:
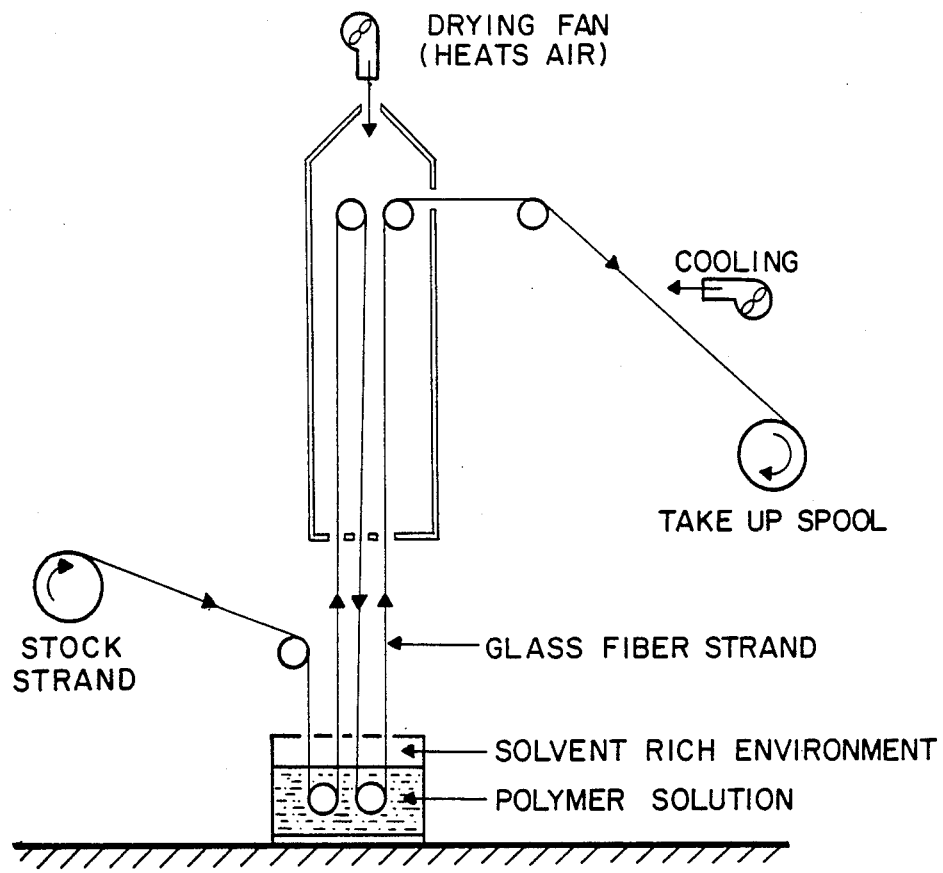
FIG. 2 is a coating apparatus used to produce the coated glass fiber strands.

A coating apparatus was assembled which facilitated the continuous coating of a single, 200 filament, strand of commercially available CemFil II AR glass. See FIG. 2.

The glass strand was dipped in the polymer solution of Example 1 by drawing the strand under and around a pulley submerged in the polymer solution. As the strand emerged from the polymer solution it carried with it a uniform deposit of polymer solution. The draw rate was approximately 3 feet per minute. Immediately as the solution laden strand left the solvent rich environment above the polymer solution bath, slight evaporation of the solvent system caused rapid gelling of the polymer solution on the strand.

The Strand, with the coating of gelled polymer, continued upward into a drying chamber where the remainder of the solvent system was driven off in approximately one minute. Air, at approximately 65° C., was forced downward through the drying chamber to enhance solvent removal. Subsequently, the dipping and drying procedure was repeated to achieve an average polymer film thickness of approximately 5 micrometers: Following the second dry stage, the coated strand was cooled to room temperature and wound onto a pickup spool. The resulting polymer film on the surface of the glass fiber strand is illustrated in FIG. 1. The thickness and integrity of the polymer coating was verified by SEM (Scanning Electron Microscope).

It is important to note that the polymer film only penetrates the circumference of the strand slightly making contact and adhering only to the outer layer of filaments of the strand. The internal space between individual glass fibers remains void after the encapsulation process is completed.

EXAMPLE 4

Cement Composite and Properties (a) - Preparation of GFRC Composite

GFRC composite specimens for testing in bending were prepared using a conventional cement mortar mix and commercial CemFil II AR glass. 12" long by 13" wide by ⅜" thick plates were fabricated in a horizontal mold and subsequently cut into twelve 1" wide by 12" long strips. One plate was fabricated with glass strands coated in accordance with Example 2 above and another plate was fabricated with uncoated glass strands for comparison with the known art. Both GFRC composite plates were prepared, cured and aged in identical manner.

The mortar mix consisted of 100 units by wt. of type I Portland cement, 100 units of type #55 silica sand, 2 units of Daxad 19 plasticizer and 35 units of distilled water. Mixing was carried out in a high shear blender.

The glass fiber strands were assembled into mats of parallel strands, spaced ⅛" apart. The ends of the individual strands were held aligned between two strips of adhesive tape. Six such mats were prepared for each test plate, providing a level of reinforcing equal to 0.82 wt. % of the composite.

The plates were prepared by first spreading a ⅛" layer of mortar in the bottom of the mold. Six layers of glass mats were rolled into the mortar, one at a time, using a conventional grooved roller known in the art. This assured that all the glass reinforcing was concentrated at 1/16" from the bottom face of the specimen. The mold was subsequently topped off with mortar, leveled and stored for one day in a sealed polyethylene bag at room temperature.

On the second day the GFRC plates were wet cut, parallel to the glass strand direction, into 1" wide strips. The twelve strips were re-sealed in polyethylene bags with a small wad of moist paper towel for curing until age 14 days.

At age 14 days the 12 strips were divided into two equal lots. One set of six strips was maintained dry in the laboratory at 20° C., while the other six specimens were submerged in 60° C. water. Submersion in 60° C. water is well known and accepted in the art to simulated accelerated aging conditions. 50 days in 60° C. water will cause total embrittlement of GFRC composites of current design formulations and represents approximately 30 years in real life weather conditions in the United Kingdom for example.

(b) - Testing

Figure 3A:
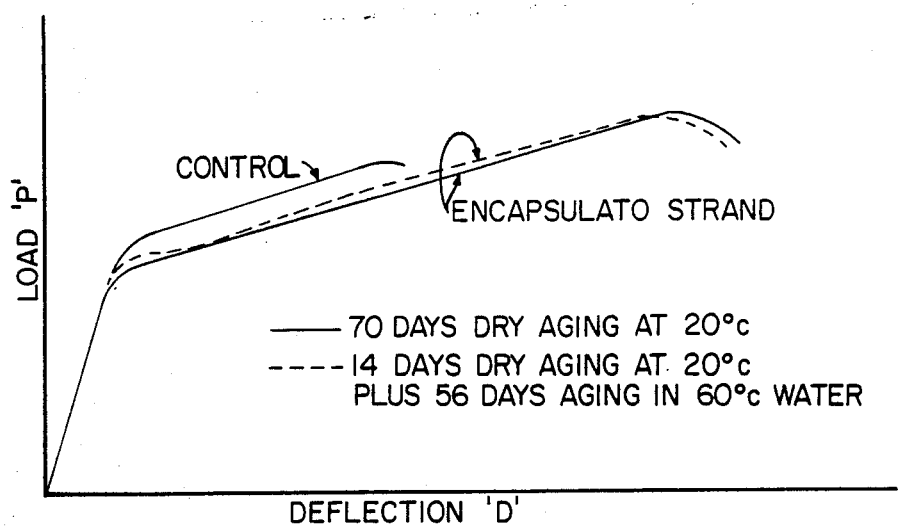
FIG. 3(a) shows the load-deflection curves for the coated and uncoated glass fiber strands.
Figure 3B:
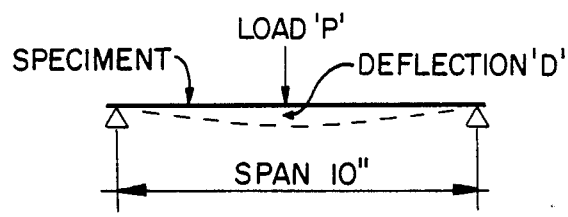
FIG. 3(b) shows an apparatus for measuring the flexure strength of the coated glass fiber strands.

The specimens were tested in flexure using an Instron testing machine as indicated in FIG. 3(b). The load 'P' and the deflection 'D' were continuously recorded. The deflection rate at the load point was maintained at 0.50 mm per minute to failure. The wet cured specimens were tested in a surface dry condition while the dry cured specimens were tested dry. All tests were carried out with the specimen temperature at 20° C.

(c) - Test Results

GFRC composites tested in bending provide results for easy interpolation of changes in properties due to aging. Results are consistent and effects produced by aging are quickly apparent.

Load-deflection curves for the bending tests described above are presented in FIG. 3(a). For comparison, the results of both types of specimens, i.e. with coated strands and with uncoated strands, are shown on the same graph. The results of the specimens stored dry are shown with solid lines and the results after an aging period of eight weeks in 60° C. water are shown dotted.

The following was observed when comparing the instant formulations with GFRC containing non-coated strands: The maximum load carried by the dry stored specimens is higher for the composites with coated strands; the extent of deflection, a measure of energy absorption by the composite, is considerably higher for the composite with coated strands; the degradation of mechanical properties after aging is very striking for the specimens with uncoated strands, as evidenced by the loss in strength and small deflection sustained at failure; and the composite specimens with coated strands sustained little change in mechanical behavior.

EXAMPLE 5

Mechanical Properties

The polymeric ingredients used in Example 3 were melt mixed to obtain samples for mechanical properties testing. In addition to the zinc-sulfo-EPDM (ZSE) material used in Example 3 an additional ZSE of a lower sulfonation level (about 10 meq. per 100 grams) was also used.

TABLE I

| Interpolymer Complexes Prepared by Melt Mixing | |
|---|---|
| Coating Material | Ratio wt/wt |
| ZSE | — |
| ZSE-SVP | 90/10 |
| ZSE-SVP | 90/10 |
| ZSE-SVP | 66.6/33.4 |
| ZSE-SVP | 66.6/33.4 |

Melt mixing was conducted in a 60 ml Brabender intensive mixer which was preheated to 150° C. The ZSE to SVP ratio was varied but zinc stearate was added to all the mixes at a level of 4 parts per hundred of rubber (phr) (based on ZSE). The zinc stearate which is an ionic plasticizer is assumed to be incorporated in the ZSE phase. ZSE material described in Example 3 incorporating 4 parts per hundred of zinc stearate is shown in Table II of this Example as ZSE-25 and the second ZSE material with lower sulfonate level and incorporating 4 phr/zinc stearate is shown as ZSE-10.

The melt mixing was carried out at 60–80 rpm and for a period of 10 minutes after all the ingredients were added to the mixer. Samples were compression molded at a thickness of about 0.035 inches for stress-strain measurements. Stress-strain was measured on micro-dumbbells at 2 inches/minute. Hardness measurements were done with Shore A and Shore D hardness testers. Properties measured at room temperature are given in Table II.

The Example shows that mechanical properties can be easily adjusted for an inter-polymer complex by either varying the component ratio or the structure of one or of both components. The possible adjustability of properties is important in optimizing coating properties for a given use.

TABLE II

| | MECHANICAL PROPERTIES OF ZSE/SVP BLENDS | | | | | | |
|---|---|---|---|---|---|---|---|
| | Ratio | Youngs Mod. | 100% Mod. | Elong. | Tensile | Shore Hardness | |
| Material | wt/wt | psi | psi | % | psi | A | D |
| ZSE-25 | 100/0 | 250 | 224 | 660 | 3,341 | 65 | 20 |
| ZSE-25/SVP | 90/10 | 580 | 367 | 603 | 2,969 | 75 | 25 |
| ZSE-25/SVP | 66.3/33.4 | 5,200 | 1,170 | 512 | 3,712 | 91 | 40 |
| ZSE-10/SVP | 66.3/33.4 | 1,180 | 429 | 319 | 587 | 76 | 24 |
| ZSE-25/SVP | 50/50 | 26,000 | 2,112 | 405 | 4,080 | 96 | 57 |

CONCLUSIONS

Example 3 shows that the coating process and compositions of the instant invention can provide thin defect free coatings which do not impregnate the spaces between the fibers of the strand. Example 4 demonstrates the advantages of the instant GFRC composite composition in mechanical properties and aging behavior.

What is claimed is:

1. A cement composition consisting essentially of:
   (a) a plurality of bundles of glass fibers, wherein the concentration of said glass fibers is about 0.1 to about 60 wt. % of the total composition weight;
   (b) a polymeric coating encapsulating said bundles of glass fibers, and said polymeric coating not impregnating the bundles of glass fibers and said polymeric coating not coating the individual fibers of the bundles of the glass fibers nor filling the voids between the individual fibers of the bundles, said polymeric coating having a thickness of about 0.1 to about 100 micrometers, wherein said polymeric coating comprises an interpolymeric complex of a neutralized sulfonated polymer and an amine containing polymer, said neutralized sulfonated polymer having a sulfonate content of about 4 to about 200 meq. per 100 grams of said neutralized sulfonated polymer and said amine containing polymer containing basic nitrogen atoms wherein the basic nitrogen content ranges from about 4 to about 500 meq. per 100 grams of polymer; and
   (c) a cementitious matrix selected from the group consisting of cement, Portland cement, concrete, mortar, gypsum and hydrous calcium silicate.

2. A composition according to claim 1 wherein said sulfonate groups are neutralized with an ammonium or metal counterion.

3. A composition according to claim 2 wherein said metal counterion is selected from the group of transition elements.

4. A composition according to claim 3 wherein said sulfonate groups are at least 90 mole percent neutralized.

5. A composition according to claim 2 wherein said neutralized sulfonated polymer is formed from an elastomeric polymer.

6. A composition according to claim 5 wherein said elastomeric polymer is selected from the group including EPDM terpolymer or Butyl rubber.

7. A composition according to claim 1 wherein said amine-containing polymer is a copolymer of styrene/vinylpyridine.

8. A composition according to claim 7 wherein the copolymer is styrene-4-vinylpyridine having about 0.5 to 50 mole percent 4-vinylpyridine units.

9. A composition according to claim 1, wherein said amine-containing polymer is selected from the group containing primary, secondary and tertiary amine units.

* * * * *